US007693842B2

(12) United States Patent
Hinckley et al.

(10) Patent No.: US 7,693,842 B2
(45) Date of Patent: Apr. 6, 2010

(54) IN SITU SEARCH FOR ACTIVE NOTE TAKING

(75) Inventors: Kenneth P. Hinckley, Redmond, WA (US); Shengdong Zhao, Toronto (CA); Raman K. Sarin, Redmond, WA (US); Patrick M. Baudisch, Seattle, WA (US); Edward B. Cutrell, Seattle, WA (US); Michael Shilman, Albany, CA (US); Desney S. Tan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 11/733,113

(22) Filed: Apr. 9, 2007

(65) Prior Publication Data

US 2008/0250012 A1 Oct. 9, 2008

(51) Int. Cl.
*G06F 17/30* (2006.01)
(52) U.S. Cl. ............... 707/10; 707/1; 707/3; 707/104.1; 382/186; 382/187; 382/306
(58) Field of Classification Search ............ 707/1, 707/3–5, 10, 100–102, 104.1; 715/541, 773, 715/810, 840, 864, 733, 768, 863; 345/179, 345/864, 173; 382/187, 306, 186
See application file for complete search history.

(56) References Cited

U.S. PATENT DOCUMENTS

| 5,007,085 | A  | * | 4/1991  | Greanias et al. ............ 345/180 |
| 5,970,455 | A  | * | 10/1999 | Wilcox et al. ............... 704/270 |
| 6,344,861 | B1 |   | 2/2002  | Naughton et al. |
| 6,681,045 | B1 | * | 1/2004  | Lapstun et al. ............. 382/187 |
| 6,829,387 | B2 | * | 12/2004 | Lapstun et al. ............. 345/179 |
| 6,867,786 | B2 | * | 3/2005  | Lui et al. .................... 345/619 |
| 7,075,512 | B1 |   | 7/2006  | Fabre et al. |
| 7,092,935 | B2 |   | 8/2006  | Yourlo et al. |
| 7,162,088 | B2 | * | 1/2007  | Lapstun et al. ............. 382/187 |
| 7,400,769 | B2 | * | 7/2008  | Lapstun et al. ............. 345/179 |
| 2003/0063136 | A1 | * | 4/2003 | J'maev ...................... 345/864 |
| 2003/0214553 | A1 | * | 11/2003 | Dodge ........................ 347/41 |

(Continued)

FOREIGN PATENT DOCUMENTS

WO 2004088534 A1 10/2004

(Continued)

OTHER PUBLICATIONS

"Fuzzy Relative Positioning for On-Line Handwritten Stroke Analysis"—Bouteruche et al.—proceedings of IWFHR 2006 (pp. 1-6).*

(Continued)

*Primary Examiner*—Jean B. Fleurantin
*Assistant Examiner*—Anh Ly
(74) *Attorney, Agent, or Firm*—Lee & Hayes, PLLC

(57) ABSTRACT

A system and method that facilitates and effectuates in situ search for active note taking. The system and method includes receiving gestures from a stylus and a tablet associated with the system. Upon recognizing the gesture as belonging to a set of known and recognized gestures, the system creates an embeddable object, initiates a search with terms indicated by the gesture, associates the search results with the created object and inserts the object in close proximity with the terms that instigated the search.

16 Claims, 8 Drawing Sheets

U.S. PATENT DOCUMENTS

| | | | |
|---|---|---|---|
| 2005/0182760 | A1* | 8/2005 | Lee et al. .................... 707/3 |
| 2005/0229118 | A1 | 10/2005 | Chiu et al. |
| 2005/0246324 | A1* | 11/2005 | Paalasmaa et al. ............. 707/3 |
| 2006/0001656 | A1* | 1/2006 | LaViola et al. ............. 345/179 |
| 2006/0018546 | A1* | 1/2006 | Lagardere et al. ........... 382/186 |
| 2006/0048070 | A1 | 3/2006 | Taylor et al. |
| 2009/0010542 | A1* | 1/2009 | Lapstun et al. ........... 707/104.1 |

FOREIGN PATENT DOCUMENTS

| | | |
|---|---|---|
| WO | 2006033068 A1 | 3/2006 |

OTHER PUBLICATIONS

"A Framework for sharing handwritten notes"—Davis et al.—proceedings of the 11$^{th}$ annual ACM symposium on user interface software and technology—1999—UIST '98 San francisco, CA (pp. 119-120).*

"Spatial interpretation of domain objects integrated into a freeform electronic whiteboard"—Moran et al.—proceddings of the 11$^{th}$ annual ACM symposium User Interface and technology—UIST '98 (Nov. 1998) (pp. 175-184).*

Sony VAIO UX50 Reviews Tablet PCs Reviews by CNET http://reviews.cnet.com/SOny_VAIO_UX50/4505-3126_7-31958097.html last viewed Dec. 28, 2006, 6 pages.

International Search Report and Written Opinion dated and mailed Oct. 2, 2008 for PCT Application No. PCT/US2008/059517, 9 pages.

Huang et al., "A Fuzzy Semantic Approach to Retrieving Bird Information Using Handheld Devices," IEEE Intelligent Systems, vol. 20, No. 1, Jan./Feb. 2005, pp. 16-23.

Willis, et al., "Tablet PC's as Instructional Tools or the Pen is Mightier than the Board!", Proceedings of the 5th Conference on Information Technology Education, Oct. 28-30, 2004, 7 pages.

* cited by examiner

900

IN SITU SEARCH FOR ACTIVE NOTE TAKING

BACKGROUND

The convergence of direct pen input devices, full text indexing of personal stores, and Internet search engines offers tremendous unexplored opportunities to design fluid user interfaces for active note taking. Active note taking can be considered to be, for example, the combination of pen-and-ink note taking with searching, linking, collecting, and sensemaking activities. This is in contrast to simple note taking, which is characterized by moment-to-moment transcription. Active note taking for example is typically performed by knowledge workers engaged in challenging creative work such as scientific research, product design, or planning complex activities, and the like. The knowledge workers often create informal pre-production work artifacts on paper, in notebooks, or on whiteboards, sketching preliminary plans and manipulating their notes to find solutions to difficult problems.

Further it has been observed that people tend to surround themselves with "task detritus" to help trigger extensions, variations, and associations on ideas. For example, messy physical desks subtly structure information and remind users of work to do; virtual 3D desktops enable users to create personally meaningful spatial arrangements by piling together document thumbnails. An unstructured notebook page is also effective in this regard as it imposes no formalism, thus allowing users to manipulate spatial arrangements of information to assist in sensemaking tasks and activities.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Using a notebook to draw design sketches, reflect on a topic, or capture and extend creative ideas are examples of active note taking tasks. Optimal experience for such tasks demands concentration without interruption. Nevertheless active note taking can also require rapid access to secondary information such as reference documents and/or emails and tertiary information referenced in the reference documents and/or emails.

The subject matter as claimed and disclosed in one aspect provides systems and methods that support active note taking by coupling pen-and-ink interfaces with an in situ (e.g., situated in the original, natural, or existing place or position, and the like) search facility that flows directly from content in a digital "notebook" containing one or more of ink strokes, passages of text, bitmaps and/or digital photos, other in-situ searches, and hyperlinks to documents on the local store, remote shares, or the internet. The claimed subject matter in a further aspect integrates four illustrative concepts: it leverages pre-existing ink to initiate searches; it provides tight coupling of search queries with application content; it promotes search queries as first class objects that can be commingled with ink notes; and it enables a quick and flexible workflow where the individual can freely interleave inking, searching, and gathering content. The subject matter as claimed in yet a further aspect offers these capabilities in an interface that can be tailored to the unique demands of pen input, and that maintains the primacy of inking above all other tasks.

In a further aspect the claimed subject matter in order to help users to "stay in the flow" of focused attention leaves the user in control by providing results only in response to lightweight, but explicit gestural interactions. Further, the disclosed and claimed subject matter is not solely a workspace directed specifically to information retrieval, but rather offers a free form workspace with a search capability as an auxiliary task in support of active note taking. Moreover, the claimed subject matter provides an in-place strategy for triggering searches, extends this in-situ strategy to the pen and ink paradigm, and offers search facilities and interaction techniques geared towards active note taking. Additionally, the claimed subject matter reifies queries by providing persistent embeddable graphical objects that distinguishes queries from other ink on the page, flags ink for subsequent search, serves as a handle to revisit a query, and further leverages metadata such as document title, author, and date as memory landmarks that can help users to sort and filter result sets, all of which are persisted with the in-situ search and the notebook (note document) itself.

Since gestural interfaces, crossing widgets, and circular scrolling, for example, are not familiar metaphors to most users, the subject matter as claimed in a further aspect can provide gestural highlighter hints which can appear by default when a user first opens a search panel. Highlighter hints can be stylistically distinct from underlying search results as well as the user's own ink content. For example, hand-printed labels can be provided for functions such that the functions can be surrounded and/or backlit by a bright yellow glow and associated gestures can be displayed as if drawn with a thick fluorescent orange chisel marker. Highlighter hints can allow users to see the full range of permissible actions. For instance, the illustrative fluorescent orange strokes can indicate the direction and shape of permissible gestures. Further, users can dismiss highlighter hints, for example, by tapping on an associated "close tips" highlighter hint that can cause the highlighter hints (entirely and/or partially) to animate into a question mark icon associated with the search panel. Such animation can thus provide indication as to how to recall the set of actions, and allows users to incrementally explore different gestures at their convenience.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
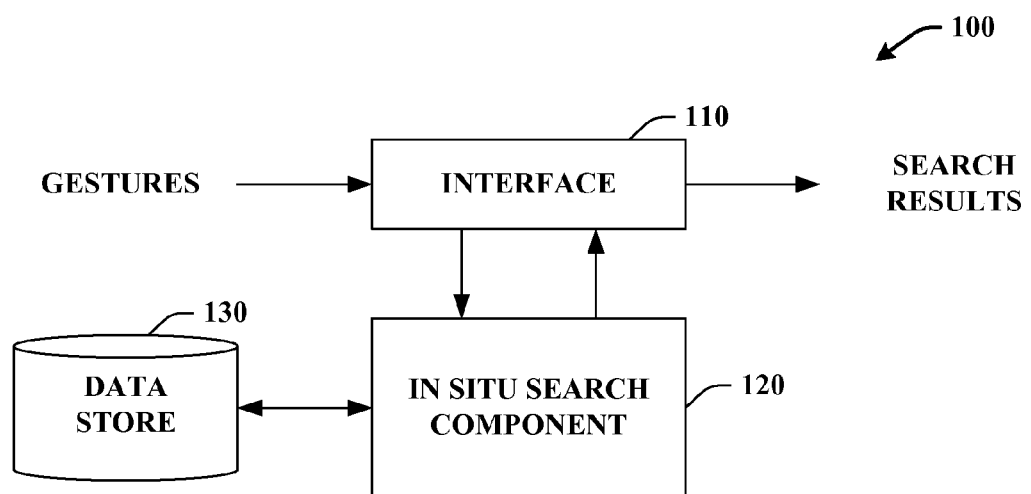
FIG. 1 is a machine implemented system that effectuates in situ search for active note taking in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It should be noted at the outset that while the claimed subject matter is explicated for the purposes of clarity, simplicity of exposition, and comprehension, in the context of Table PC's and direct pen input devices, the subject matter as claimed is not so limited. The claimed subject matter can find applicability in a plethora of other contexts, mechanisms, and applications beyond the inked notes paradigm. For example, the claimed subject matter can be applied to other types of documents created by an application (e.g., word processing, spreadsheet, graphic) without departing from the intent and scope the subject matter as claimed. Accordingly, any and all such applicability, and derivations thereof, is deemed to fall within the ambit of the claimed subject matter.

Interfaces designed to support creative sensemaking tasks can and should help users "stay in the flow" of focused attention. In one illustrative aspect the claimed subject matter offers rapid, minimally distracting interactions for users to seek, gather, and manipulate the "task detritus" of electronic work (e.g., links to documents, clippings from web pages, or key emails on a topic, and the like) across multiple notebook pages. The utility of the claimed subject matter in one aspect can lie in its in situ search facility that provides users with a lightweight technique to perform searches directly from existing ink notes, and then to incorporate content from search results into their notes.

Embedding search within users' task contexts enables them to locate content without switching to "search applications," that could derail users from the creative flow of active note taking, particularly on a tablet where screen real estate is limited, text entry is slow, and keyboard shortcuts can be unavailable. In situ search also naturally affords several other key design properties, such as for example, leveraging pre-existing ink to initiate searches thereby reducing the cognitive barrier between creating ink on the page and creating queries based on that ink (e.g., users do not waste time or have to break flow by transcribing terms to a separate query box, rather they can recycle the effort of writing notes by triggering queries from already existing ink on the page); promoting queries as first class objects commingled with ink notes (e.g., users are allowed to indicate that a search needs to be performed, but to defer opening the search results until later, when time and attention permit), such that the resulting queries, represented by an embeddable graphical object (hereinafter also interchangeably referred to as a "breadcrumb") that can be manipulated (e.g., copied, pasted, or rearranged, etc.) just like any of the surrounding inked notes on the page; interleaving inking, searching, and gathering so that users can freely move back and forth between ink notes and search results thereby permitting users to jot notes, trigger a search, browse search results, make new margin notes, start additional searches for side-by-side comparison, or defer an ongoing search in favor of some other activity; and tightly coupling queries with application content by allowing users to incorporate individual query results into their notes (e.g., the user, through the mechanism of the breadcrumb, can drag search results directly into his or her notes for future reference or to create ad-hoc arrangements of useful documents, or can pull selected parts of a document into his or her notes by taking a snapshot of it).

The claimed subject matter therefore does not require users to actively switch to a specific search application, shift attention to a separate query box, or force transcription or translation of ink to text, and allows users to return to the primary active note taking task with at most a single pen tap thereby maintaining high flexibility to support workflow with a fluid evolution of steps in pursuit of search results and content, rather than a regimented schema to which users must adhere. Further, the claimed subject matter seeks to satisfy queries where the rough time cost of searching can range from less than a second to several minutes.

The claimed subject matter additionally allows users to gather beneficial "task detritus" that they find in their searches and incorporate it directly into their ink notes. Further, the subject matter as claimed, in order to keep search as a secondary task, by default enables the result list generated by a search, when displayed, to remain significantly smaller than the tablet's screen; in this manner the margins are made available for inking, unnecessary hand and eye movement minimized, and content can be dragged directly from the search into notes. Furthermore, by offering search results that do not overwhelm the tablet's screen, encourages side-by-side-ability by making it possible to launch, view and compare multiple searches. Nevertheless, in some aspects of the claimed subject matter, the results list still can be enlarged to encompass as much of the screen as desired.

Since it has been observed that users may want information from a wide variety of source documents (e.g., email, ink notes, and/or spreadsheets) the claimed subject matter enables access to information from a variety of sources, and provide seamless pen-operated mechanisms for common cross-application functionality such as opening documents, scrolling, or taking snapshots of any content that is visible on the screen. Additionally, the claimed subject matter provides a self revelation functionality so that users can discover the primary search features without prior instruction.

Illustrated in FIG. 1 is a machine implemented system 100 that effectuates in situ search for active note taking. System 100 includes interface 110 that continuously receives input in the form of gestures, for example, from a tablet and associated stylus input device that can be associated with a processing device (e.g., a computer workstation, Personal Digital Assistant (PDA), lap top computer, notebook computer Smart phone, cell phone, ordinary or digitally watermarked paper used with a pen capable of digitizing its movements, industrial automation device, industrial and/or consumer electronic equipment, etc.). On receipt of input in the form of gestures interface 110 conveys this information to in situ search component 120.

Figure 9:
FIG. 9 provides illustration of highlighter hints in accordance with an aspect of the claimed subject matter.
Figure 9:
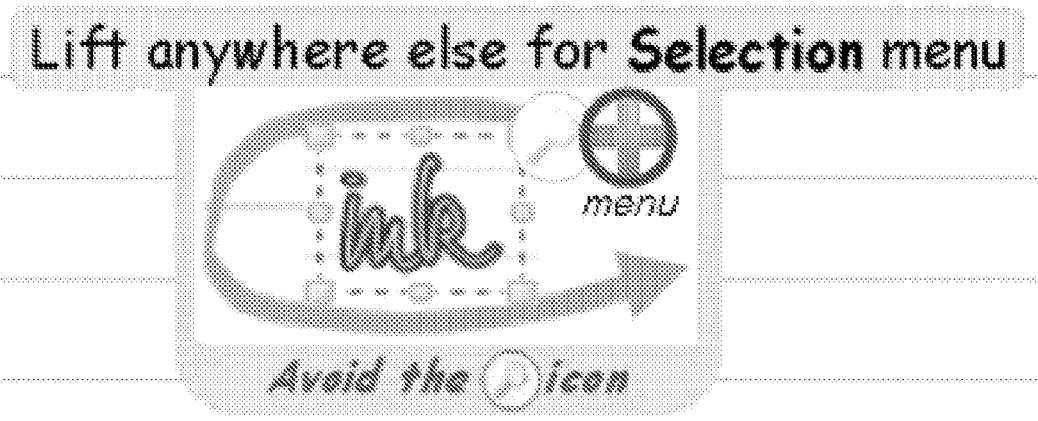

In situ search component 120 can consult data store 130 to determine whether or not the received gesture is included in a set of recognized gestures (e.g., circumscribing or encircling previously inked characters, sets of characters, words, and/or phrases written in ink, highlighting or emphasizing individual characters, strings, words, and/or phrases previously written in ink, underlining or demarcating previously inked characters, strings, words and/or phrases, and the like), and whether the received gesture indicates that the in situ search functionality is being requested by a user. It should be noted that similar gestures and/or actions can be carried out in connection with non-inked characters, strings, words and/or phrases created by a word processing and/or spreadsheet applications, for example. Additionally, other actions and/or gestures can be employed in connection with other forms of data, such as, for example, picture objects, graphical images, graphemes, glyphs, digital images, portions of bitmaps for optical character recognition, etc. Note that the gesture(s) to create an in situ query and the gesture(s) to view the results of such a query may be different from one another. Each gesture may also consist of one or more strokes. For example, in accordance with one aspect of the subject matter as claimed, an incomplete lasso (a lasso that does not meet itself) creates a query, and a second stroke on the embedded graphical object opens the results; whereas a lasso with a "pigtail" (a small self-intersecting loop) creates a query and opens the results in a single stroke. In a further aspect, a lasso that the user closes to meet its starting point (within the bounds of an icon indicating search functionality attached thereto), creates an in situ search; the search icon may resize itself in proportion to the size of the lasso In yet a further illustrative aspect, the search icon can be coupled with one or more additional icons to show other functions, such as selecting the encompassed region for contextual commands (FIG. 9 illustrates the foregoing). In a further illustrative aspect, the search functionality may be indicated by lassoing content and then holding the pen stationary (within a reasonable tolerance) for a short time. In yet a further aspect, the search functionality can be indicated by "pinning" the selection down, e.g., by lassoing content and then bearing down with more force on the pen so as to produce an increase in the pressure or contact area of the input device with a sensing surface. Note that in all of these illustrative aspects, the term "lassoing" has been employed as a general term for a gesture indicating a region of space, and those skilled in the art will recognize that other gestures may be used to indicate desired regions of the screen, including but not limited to underline or crossing through ink strokes or other content, crop marks, margin bars, double-crossing through content (crossing and then returning to the starting point of the stroke), dragging out a rectangular selection, scribbling out an area, tapping on content, or hovering over content, or drawing any combination of such strokes to form a selection.

Where in situ search component 120 ascertains that the received gesture provides indication the user wishes to instigate a search (e.g., the user has encircled, highlighted or underlined with the stylus previously inked characters, strings, words and/or phrases), in situ search component 120 can proceed to convert the encircled inked characters, words, strings and/or phrases to a digitized form (e.g., converts handwritten cursive script into a digitized standard form, or converts other objects into a keyword query or vector-based representation of one or more likely search terms associated with the selected object(s)) and employs the digitized form as a search term to initiate the a search. In situ search component 120 also generates an embeddable graphical object that can be incorporated into the inked text at a location adjacent to the encircled ink that initiated the search, and further the results, filters, handwriting corrections, query revisions and history, and sort order (e.g. on title/subject, author, or date) of the search can be associated with the embeddable graphical object so that the user can immediately peruse the results, or alternatively the user can defer viewing the result to a more convenient time, or even return to previously viewed searches from exactly the point where they were last viewed. In some illustrative aspects, the search refreshes the results list to reflect the potential of new content whenever the user revisits the embeddable graphical object. In other additional and/or alternative aspects, the system may cache the results list as it would have appeared at the time the search was created or when the results were first viewed.

Figure 2:
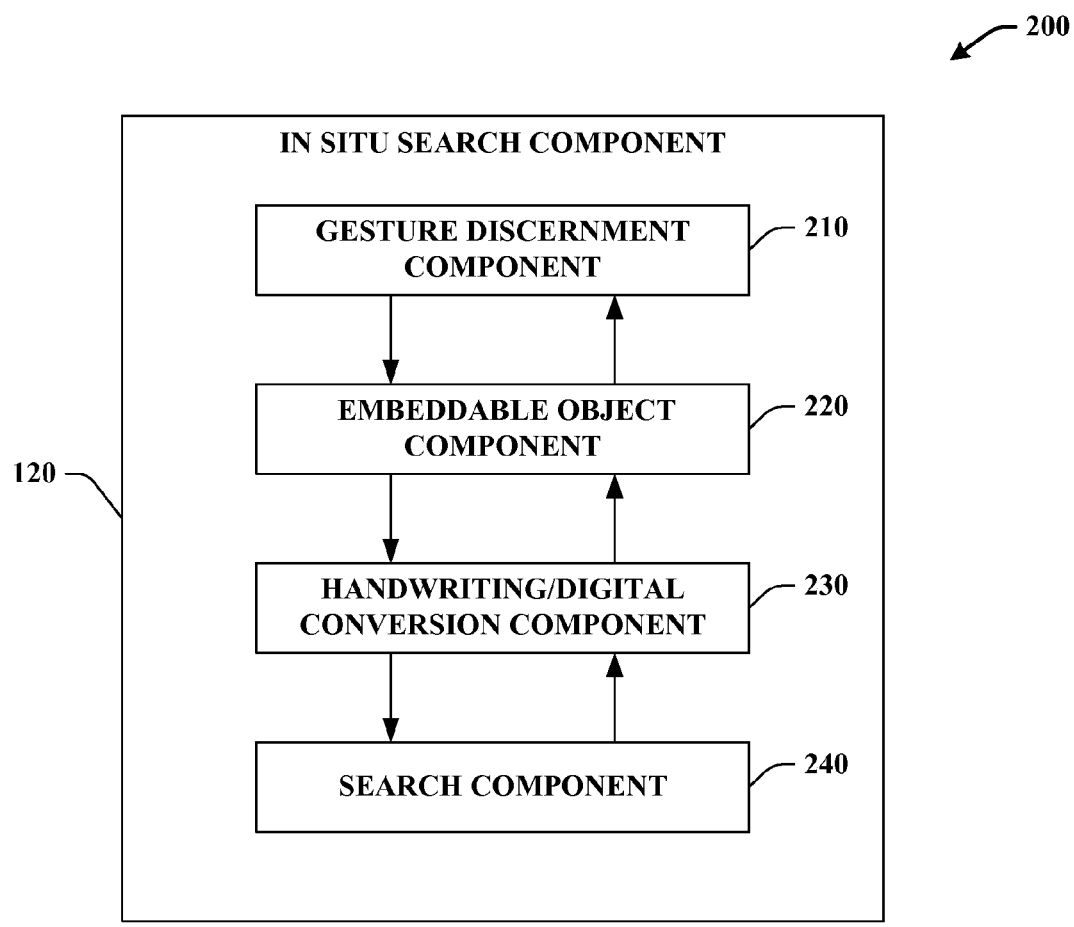
FIG. 2 provides a more detailed block diagram of an in situ search component in accordance with one aspect of the claimed subject matter.

FIG. 2 provides a more detailed depiction 200 of in situ search component 120. As illustrated, in situ search component 120 can include a gesture discernment component that assiduously monitors incoming input to discern whether a recognized gesture has been provided by the user via a tablet and associated stylus input instrumentality. Stylus input instrumentality can include, for example, a human digit and/or appendage (e.g., finger), or any other suitable input device. Recognized gestures can include the circumvolution of inked characters, and/or sets of character strings to flag particular lexemes, words, and/or phrases, picture objects, graphical images, graphemes, glyphs, and digital images, for example. When an appropriate gesture is detected, gesture discernment component 210 can instigate embeddable object component 220 to generate a persistent and embeddable graphical object to be displayed and confederated with the contextual ambit of the flagged words and/or phrases. In some illustrative aspects, one or more of the selected content, the encompassing gesture stroke(s), or proxies thereof are associated with the embeddable graphical object itself This permits, for example, copying the embeddable object to copy the associated ink strokes as well, if desired. In further illustrative aspects, the associated content remains independently actionable (e.g. selectable), whereas in other additional and/or alternative aspects such content may be "grouped" with the embeddable object such that they are one not independently actionable (e.g. attempting to select one component object selects the embeddable object and all associated content).

In situ component 120 can further include handwriting/digital conversion component 230 that can scan through the inked handwritten script (e.g., graphemes, block, and/or cursive) and provide handwriting recognition conversion to provide a digital form of the inked handwritten script. Handwriting/digital conversion component 230 can be used in conjunction with an artificial intelligence/machine learning component (not shown), or additionally and/or alternatively the handwriting/digital conversion component 230 can itself comprise or include the intelligence/machine learning component. In general, there are several types of learning algorithms that can be utilized with respect to intelligence/machine learning. In particular, conditional maximum entropy (maxent) models have been widely employed for a variety of tasks, including language modeling, part-of-speech tagging, prepositional phrase attachment, and parsing, word selection for machine translation, and finding sentence boundaries.

They are also sometimes called logistic regression models, maximum likelihood exponential models, log-linear models, and can be equivalent to a form of perceptrons, or single layer neural networks. In particular, perceptrons that use the standard sigmoid function, and optimize for log-loss can be perceived as being equivalent to maxent.

Further, in-situ search component 120 can also include search component 240 that can conduct searches of an individual user's search space (e.g., various persisting means associated with the user, such as hard drives associated with the processing device and/or distributed over Wide Area Networks (WANs), Local Area Networks (LANs), and/or Storage Area Networks (SANs), USB drives/memory sticks, and/or memory devices affiliated with the user and confederated with the processing device) as well as the Internet, based at least in part on the a digital form generated by handwriting/digital conversion component 230. The search effectuated by search component 240 can be conducted as a background process in order to detract from the distracting effects such searches can have on individuals' concentration on the task at hand. Similarly, search results can be associated with the persistent and embeddable graphical object and can be immediately displayed or displayed at a later time depending on individual preference.

Figure 3:
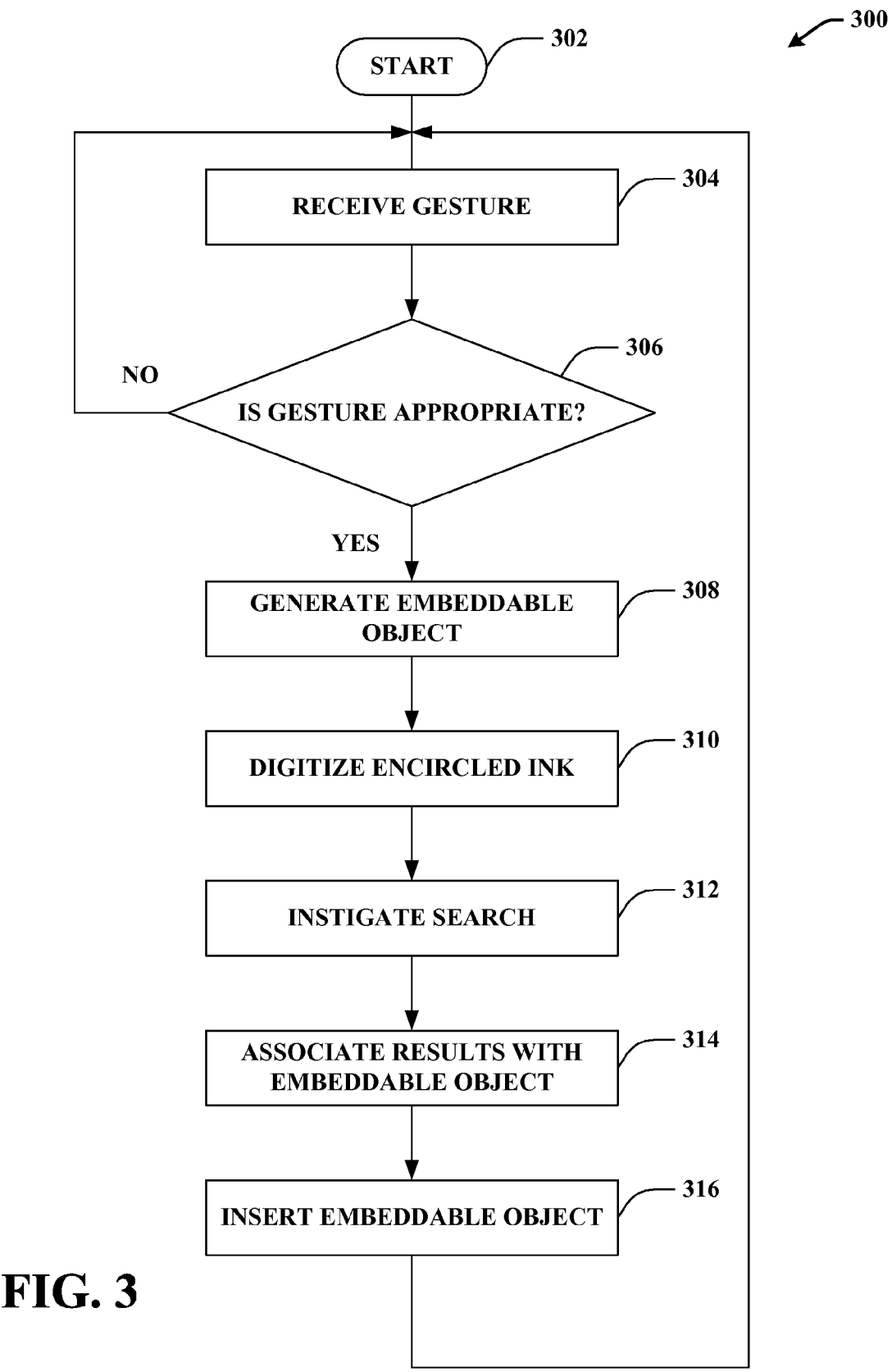
FIG. 3 illustrates flow diagram of a methodology implemented on a machine that facilitates and effectuates in situ search for active note taking in accordance with an aspect of the disclosed subject matter.

In view of the exemplary systems shown and described supra, methodologies that may be implemented in accordance with the disclosed subject matter will be better appreciated with reference to the flow chart of FIG. 3. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 3 illustrates a methodology 300 that can be implemented on a machine that effectuates in situ search for active note taking. The method commences at 302 where various processor initializations tasks and background activities are performed. After these tasks have been performed the method can proceed to 304 where a gesture is received. In typical "digital notebook" applications, by default all pen strokes on a notebook page are treated as ink. To interact with the notebook, for example to insert a new page, a user holds down a non-preferred hand button, or a stylus button, while drawing a gesture. In some alternate and/or additional aspects the user can also signal a transition to gesture mode by tapping or stroking on an icon, menu, marking menu, or other graphical control to start gesture mode. Such a gesture mode may persist for only the next stroke, or for all subsequent strokes until the user exits gesture mode (e.g. by reselecting pen mode, or by performing certain actions such as opening a search that automatically revert to pen mode on the user's behalf). Furthermore, in some illustrative aspects pen strokes starting on embedded graphical objects representing searches act on the object, rather than leaving ink, so that the user does not have to hold down the gesture button or otherwise explicitly select gesture mode when using the pen on the embedded graphical objects. Thus, at 304 the methodology can await for a gesture to be received. When a gesture is received at 304 (e.g., the user held down a stylus button while drawing a gesture) the method proceeds to 306 where it is ascertained whether the gesture that was received pertains to the instigation of a search. Illustrative gestures that can indicate that users wish to instigate a search can include using, for example, a lasso gesture (e.g., encircling the inked text), an underlining gesture and/or a sweeping gesture representative of highlighting the inked text, etc. If at 306 it is determined that the gesture received does not comport with a pre-specified and cognizable gesture (e.g., NO) the method returns to 304 to await an appropriate gesture. Otherwise (e.g., YES) the method proceeds to 308 whereupon an embeddable graphical object (e.g., a breadcrumb) is generated.

An embeddable graphical object is a visible representation of a query that acts as a handle placed in close proximity to, and/or logically attached to, the ink that triggered the query. Nevertheless, it should be noted that embeddable graphical objects can be placed in any location desired by the user and/or heuristically determined by the system. In some aspects of the claimed subject matter, in less that a second and without interrupting the flow of a note taking task, a user can, for example "lasso" or "highlight" some ink to specify a search, and leave a search breadcrumb to be visited later. When the user returns, he/she can hover over the breadcrumb to see details, or to view the search results. Embeddable graphical objects or breadcrumbs serve as persisted reminders to revisit previous queries, and implicitly record a history of queries in the context of the notes that led to the search. Breadcrumbs can be cut, copied, pasted, selected, and/or moved around the user's notes. Breadcrumbs are furthermore persisted with the content itself (e.g. when saved as part of a digital notebook or note document).

Once an embeddable graphical object has been generated at 308 the method can proceed to 310 where the inked text that has been, for example, lassoed or highlighted, can be digitized and analyzed (e.g., lexically scanned to determine what the search terms should be). Digitizing and analysis of lassoed and/or highlighted ink can take the form of pattern recognition, optical character recognition, character recognition and/or handwriting analysis that can be carried out, for example, by a machine learning and/or artificial intelligence component. Furthermore such component may be closely tied with interactive handwriting correction, where the user may edit the original strokes, or proxies thereof, add further strokes or words to the original query; or the user may perform gestures indicating desired corrections, such as splitting or joining ink stokes, overwriting individual characters of the recognized word(s), deleting individual characters or words from the recognition, to force the recognizer to adopt an interpretation of the strokes other than that deemed most probably without such additional input from the user. Furthermore such handwriting correction mechanisms may be unified with additional controls to clear the entire query, add words to the query, or remove words from the query so as to make the editing of the handwriting/query a seamless and consistent process for the user. After the lassoed and/or highlighted ink has been digitized and analyzed at 310, the resultant digital form can be employed as parameter to instigate search functionality at 312. The search can be run either as a foreground process or a background process. The choice of whether to have the search functionality execute in foreground or background in a matter of individual preference. Regardless of whether the search is effectuated as a foreground or background process, the search will typically yield results that can be displayed immediately upon completion of the search or display of the results can be deferred to a more conducive time when the user is more receptive to viewing the results. Nevertheless, whatever the user preference in this regard (e.g., view the results immediately or alternatively defer viewing to a later time) the results of the search can be associated with the embeddable graphical object at 314. Once the search results have been affiliated with the embeddable graphical object, the embeddable object together with the associated search results can be inserted at 316 in a location contiguous or abutting the circled or highlighted ink that instigated the search to provide further context in relation to the circled and/or highlighted ink, at which point the methodology cycles back to 304 to await further gestures received from the input source. Furthermore the embeddable object itself may be scaled in proportion to the total size of the lasso, e.g. so that a small selection has a small embeddable object attached to it, but a large selection would have a full-sized embeddable object attached to it. The embeddable object furthermore may be tapped or stroked to select it, whereupon the user is free to explicitly move it elsewhere, or resize it larger or smaller, if desired.

Figure 4:
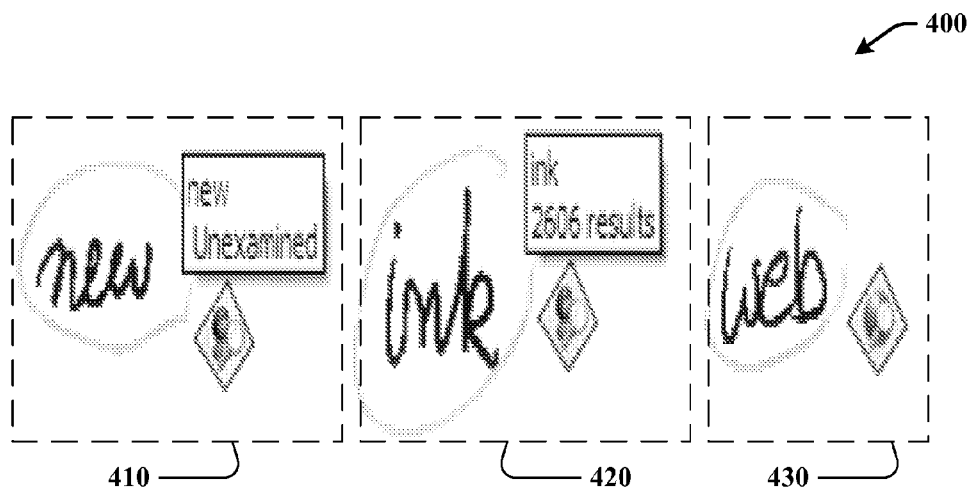
FIG. 4 depicts illustrative embeddable graphical objects in accordance with an aspect of the claimed subject matter.

FIG. 4 depicts illustrative embeddable graphical objects 400 in accordance with an aspect of the claimed subject matter. Embeddable graphical objects 400 can serve as reminders to revisit previous queries, and implicitly record a history of queries in the context of the notes that led to the search. Embeddable graphical objects 400 can be cut, copied, pasted, or selected and resized or moved around in the user's notes. As illustrated in FIG. 4 there are three illustrative embeddable graphical objects 410, 420, and 430 respectively that provide information about the searches they represent. Embeddable graphical object 410 represents a query where the user has never opened the search results, hence the embeddable graphical object has associated therewith a label (appearing when the input device hovers over the object) that informs one that this particular object is "unexamined". Embeddable graphical object 420 indicates a personal search (search of a local information store) that has previously been opened and that has 2606 results associated with it. Embeddable graphical object 430 illustrates an embeddable graphical object that was last used to perform a Web search. The user may employ the embeddable graphical object to flip the same query back and forth between personal, web, or other types of searches. In some additional and/or alternative aspects of the claimed subject matter, the embeddable graphical object maintains the state information associated with each type of search, so that the user can quickly return to a previous state when flipping the type of query.

Figure 5:
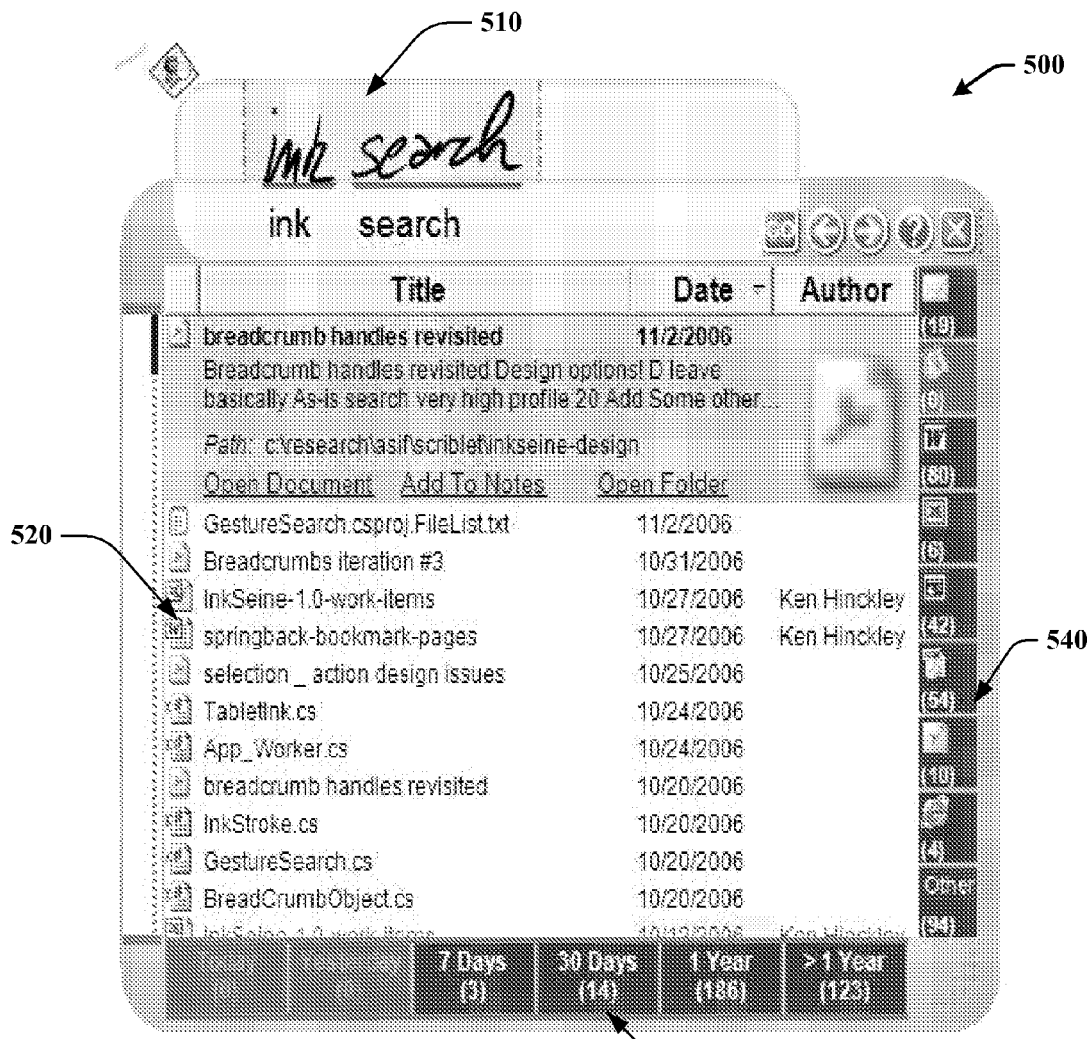
FIG. 5 provides an illustrative search panel that can be utilized in one aspect of the claimed subject matter.

FIG. 5 provides an illustrative search panel 500 that can be utilized in one aspect of the claimed subject matter. When the user opens search results, a search panel as depicted in FIG. 5 can appear. Search panel 500 allows simultaneous viewing of notes and search results. The search panel results list, widgets, and a few gestures allow the user to scroll through the results, apply filters, modify the query, and inspect result documents. Multiple search panels can be opened simultaneously; each search panel being an independent object with its own state, including query terms, filters, etc. Search panels "remember" their state information when they are closed, and reinstate it when next opened. This makes it easy for users to defer searches, and quickly pick up where they left off. With reference to illustrative search panel 500, the top part of the search panel 500 is dedicated to a query area 510 that shows the handwritten query, the handwriting recognition, and action buttons. The main design element of the search panel is the results list 520 which displays a one-line summary of each result with a file type icon, document title, date the document was created or revised, and the author of the document. By default, all searches initially sort the results by date since time has been shown to be a powerful filter for memory of events. As with standard list box interfaces, the user can tap on the heading for any column to sort the results. The results list 520, as illustrated, is surrounded on the bottom and right by timeline 530 and file type 540 filters respectively that can be used to filter results. The state of all filters, sort orders, etc. appearing in a search panel are persisted with the corresponding embeddable graphical object.

Figure 6:
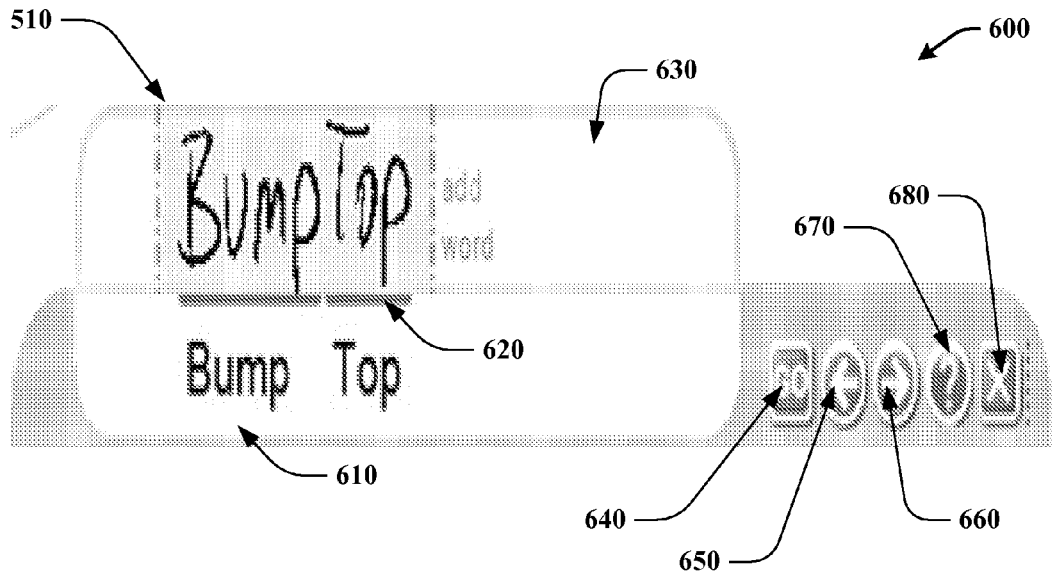
FIG. 6 provides a further and more specific view of query area seeded with selected ink in accordance with aspects of the claimed subject matter.

FIG. 6 provides a further and more specific view 600 of query area 510 that is seeded with the lasso-selected ink (e.g., "Bump Top"). As mentioned supra, the user does not have to transcribe any ink. The ink from the notes is scaled to fit within the vertical extent of the query area 510. The query area may also include scrolling mechanisms or multiple lines of input to support long queries. In some illustrative aspects, non-alphanumeric characters are stripped from the text before issuing the query, because ink notes often contain extraneous punctuation the user may not intend as part of the query. Search engines often use punctuation to specify "expert" features, so stripping it prevents unexpected results. The claimed subject matter immediately starts a search based on the assumption that the ink has been recognized correctly. In the great majority of queries, recognition succeeds and the user can ignore the query area altogether, other than to perhaps verify that the handwriting recognition is correct in cases where the expected results do not appear.

Handwriting recognition correction and query refinement allow the user to modify of the text string used to perform the search. The interface provided by the claimed subject matter unifies the two operations and gives users flexibility in fixing "errors," whether they result from messy handwriting or ill-conceived queries. The textual recognition of the handwriting appears immediately below 610 the corresponding ink words. The user can correct segmentation errors by stroking on the segmentation bars 620. Tapping on the recognized text enables character-by-character editing. Typically, this is only required for out-of-vocabulary words; however, the claimed subject matter appends all words that appear in the user's indexer corpus to the list of words accepted by the recognizer, so this is rarely necessary.

Additionally, the user can add terms to the query by writing in the blank space 630 to the right of the initial ink used to trigger the search ("add word" appears when the pen hovers over this area). The user can then tap the Go button 640, or the claimed subject matter can automatically refresh the query results two seconds after the pen is lifted. Unlike incremental search when typing text strings, "instant" update for search during handwriting is very challenging because accurate handwriting recognition results usually cannot be obtained until the user has finished writing an entire word. Thus, in this context it is better to wait until the user has finished writing before reissuing the query. The user can also delete words from their ink query by scratching them out. In some alternative and/or additional aspects of the claimed subject matter, the user can alternatively delete words by scratching out or crossing through words in the recognized text string, or by hovering the pen above a recognized word for a short time and then tapping on a close box (a small "[x]" symbol) that appears.

In some illustrative aspects of the claimed subject matter, the user may start an entirely new query by simply writing over the existing ink starting at the far left, or by tapping in the small area at the far left. In other illustrative aspects a "Clear" action button appears in proximity to the query area and can be tapped to erase the current query. If the handwriting recognition is incorrect, it is often easier to rewrite the words than it is to perform detailed repairs to the recognition. This is also useful if the user realizes that the query itself needs to be scrapped to find a desired result.

Apart from the Go button 640 mentioned above other action buttons can include the forward 650 and back 660 arrows that allow for undo and redo; the question mark 670 that brings up a help functionality; and close 680 that dismisses the search panel, while persisting its current state so that it may be recalled using the embedded object. In some alternative and/or additional aspects of the claimed subject matter, some or all of these functions are grouped into a menu, such as a marking menu, that is attached to the query area.

Figure 7:
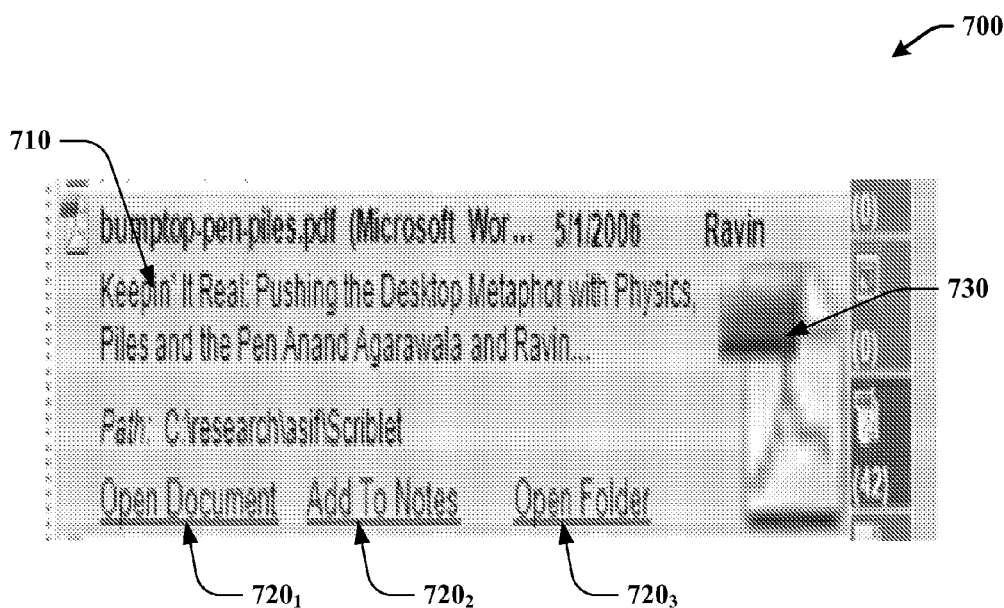
FIG. 7 provides an illustration of a focus result in accordance with an aspect of the subject matter as claimed.

FIG. 7 provides an illustration of a focus result 700. In some illustrative aspects, the first result in the list automatically is shown as "the focus result" when the user first opens the search panel. In further illustrative aspect, the focus result 700 is a consequence of actions take by the user. For example, the user can tap on a result provided in the results list (See FIG. 5, item 520). When the user taps on the result the result is brought into focus as depicted in FIG. 7. The focus result 700 displays additional information including a text snippet of the first two lines of the document 710, contextual hyperlinks that offer actions for that document $720_1$, $720_2$, and $720_3$, and a thumbnail of the document 730. In some alternative and/or additional aspects, the user can highlight more than one result as a focus result by tapping on them in quick succession, by tapping on multiple results while holding a modifier key such as SHIFT or CTRL, or by sweeping the input device vertically across multiple results.

A user can gather result documents by dragging thumbnails 730 out of the search panel and directly into his surrounding notes. In some illustrative aspects, the user can also drag results out of the list by making a stroke that exits the search panel horizontally, and then dragging the result to a desired location. This creates a hyperlink icon in the user's notes that can be used to quickly re-access the document. Hyperlink icons provide shortcuts to result documents that can be included in notes, annotated, copied and pasted, and organized into sets of useful documents for subsequent access. These icons display the corresponding document title when the user hovers over the icon. Clicking the Open Document link 720, opens the document using its host application, and also brings up a semi-transparent tracking menu to support common pen-based cross-application interactions. The Add To Notes link $720_2$ pastes a hyperlink icon into the upper-left corner of the page of notes. In some additional and/or alternative aspects, the Add To Notes link $720_2$ adds each successive icon to a tidy row of icons to the right of the embeddable graphical object that originated the query. The Open Folder link $720_3$ replaces the results list with all other files co-located with the focus. In further illustrative aspects, the Open Folder link instead opens a new window with a standard file system viewer (e.g. Windows Explorer).

Figure 8:
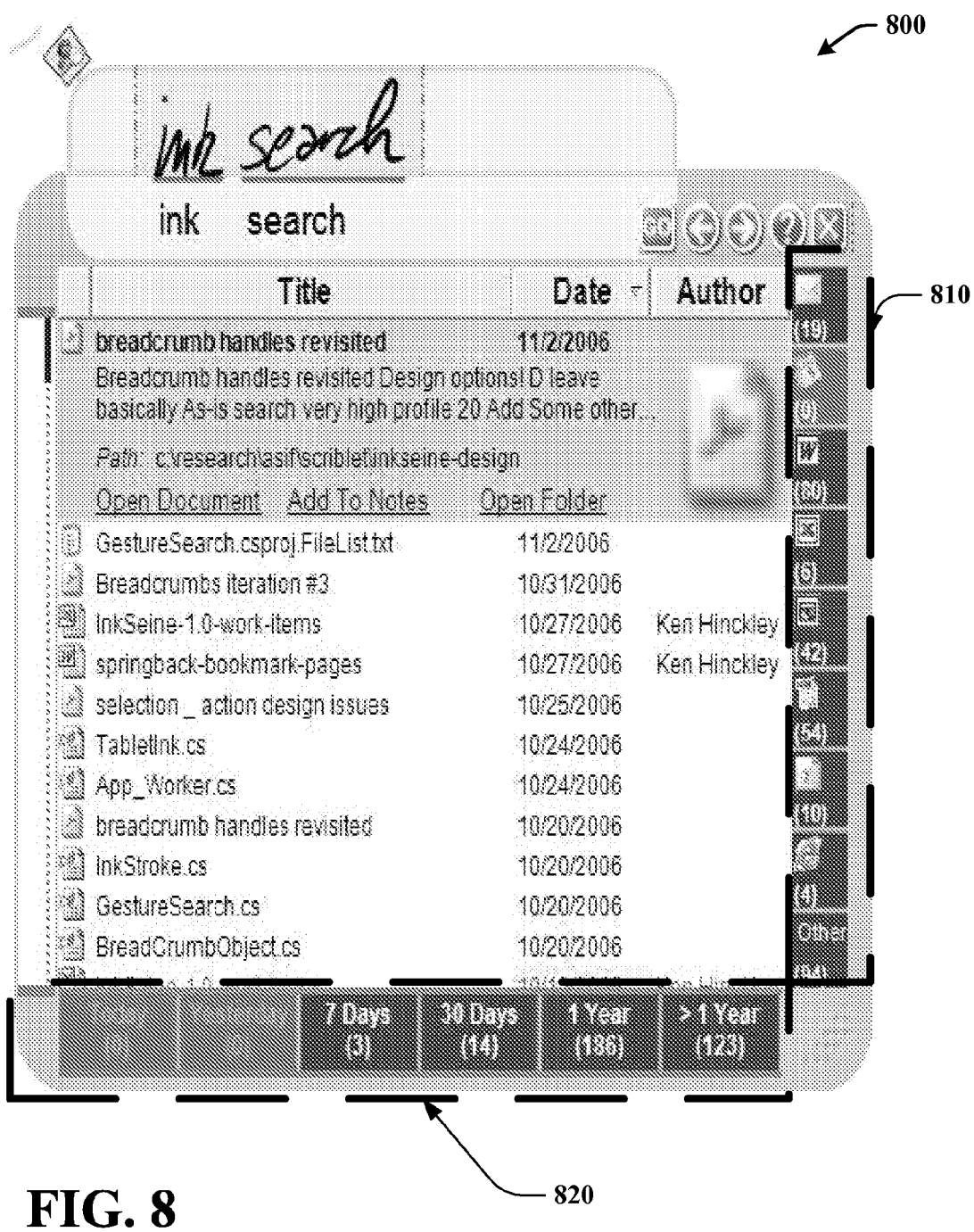
FIG. 8 provides another illustration of a search panel in accordance with yet another aspect of the claimed subject matter.

FIG. 8 provides another illustration of the search panel 800 in accordance with an aspect of the claimed subject matter. As mentioned before in relation to FIG. 5, the search panel can provide file type 810 and timeline 820 filters respectively that can be used to filter results. File type filters 810 enable users to limit the result set to specific types of files. The user may tap or cross any filter to activate it. Tapping on the PDF file type filter, for example, filters the result set so that only PDF files are shown. If a document type does not appear in the results list, the corresponding file type filter icon is shown grayed-out so that the user can quickly see which file types do or do not occur in the results. To filter by multiple file types, the user can cross several file types in a single stroke, for example by crossing the Word, Excel, and PDF filters to focus the results on common document formats. The user may avoid a filter when crossing by sliding the pen around it. To exclude unwanted file types from the result set, e.g., emails and calendar items, the user can cross the filter icons in succession, and then exit the filter strip to the right, away from the results list. This removes emails and calendar items from the results list.

Timeline filters 820 displayed along the bottom of the search panel 800 enable users to filter the results by date. The timeline can include corresponding gestures to narrow results to a particular range of time (e.g., crossing Today, Yesterday, and 7 Days in succession to focus the results list on recent results). These quick filtering gestures help users narrow down lengthy results lists to a manageable size.

The claimed subject matter can include a tracking menu for cross-application functionality. The tracking menu appears by default when the user opens a result document, or opens a hyperlink icon that was previously dragged onto a note page. The tracking menu can afford interaction with legacy mouse and keyboard applications. For example, the tracking menu can support scrolling of documents with a scroll ring gesture (e.g., large, fast circling movements that can indicate fast scroll rates, whereas, small, controlled circling movements that can indicate slow controlled scroll rates) that can provide eyes-free scrolling that allows users to focus on the task at hand. Further, the illustrative tracking menu can also include a capture tool for grabbing clippings from a document. In some illustrative aspects the tracking menu may also include a close box, to dismiss the menu; in further aspects, this close box may further close the underlying application such that the user can close the tracking menu and an open result document with a single click. In some additional and/or alternative aspects, the tracking menu also includes a move (drag) handle that can be used to place and pin the menu at a specific desired location. Furthermore, although the term "tracking menu" has been utilized, in some illustrative aspects the menu does not track the pen while the pen moves in hover state, but rather stays at a fixed position until explicitly dragged elsewhere.

For instance, illustrative gestures and/or actions that can be employed in conjunction with the tracking menu can include, for example, touching and/or bringing into close proximity of a touch-sensitive surface an implement (e.g., stylus, pen, human finger or digit, etc.) and/or directing electromagnetic radiation of any wavelength (e.g., visible light, infrared light, ultraviolet light, microwaves, etc.) on an appropriately sensitive surface such that indication is provided in an outer, proximal, and/or peripheral area associated with the tracking menu (e.g., an outer ring of the tracking menu) that a user wishes to invoke a scroll ring for scrolling through results lists. As stated above, the scroll ring can use a natural circling motion to scroll a focus window in an underlying application window. After the user acquires the outer, proximal, and/or peripheral area associated with the tracking menu, the circling gesture is entirely eyes-free, allowing the user to focus visual attention on the content scrolling by. This can remove the need for the user to interact with scroll bars, which can be difficult to use with pointing instrumentalities (e.g., styluses, pens, touch pads, and the like). Further, the user can also use the pointing instrumentality to interact with host applications if desired, simply by locating the pointing instrumentality anywhere beyond the outer limit if the tracking menu.

Other illustrative gestures can include a tapping and sweeping gesture that can be employed where users find desired content while scrolling through documents of interest, wherein the user can tap on a capture button associated with the tracking menu to trigger a screen capture mode, and thereafter can sweep out a rectangle or lasso an irregular region to indicate any desired content that he wishes to capture, for instance. Further, illustrative gestures and/or actions can also include lifting the pointing instrumentality off the touch sensitive surface after performing the sweeping out gesture to provide indication that swept and/or circumscribed content should be placed, for example, on an associated clipboard (e.g., placed in memory, etc.) and/or place the circumscribed content directly into the current page of notes. Thereafter, users can utilize the tracking menu to further scroll through documents and/or to take more clippings.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
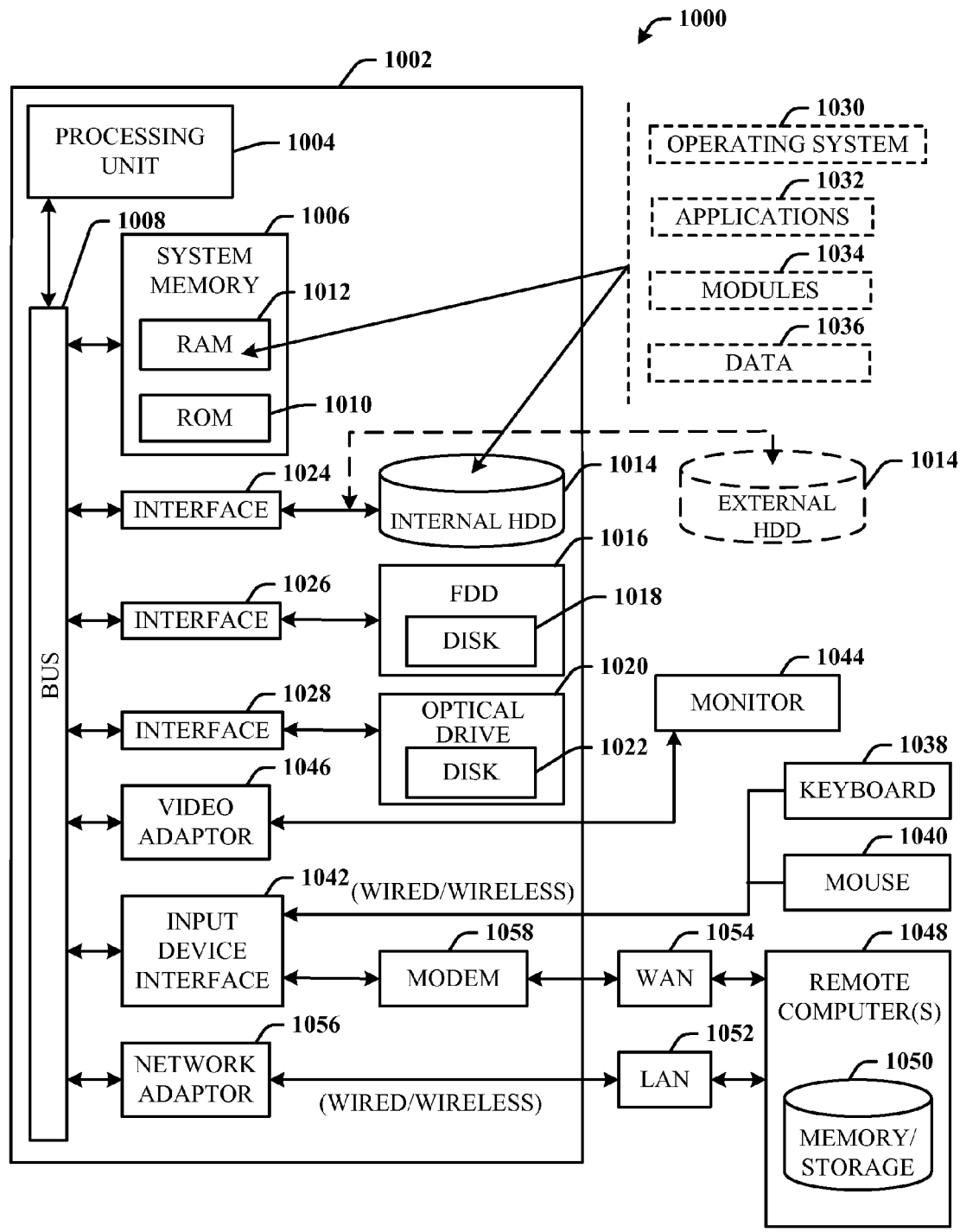
FIG. 10 illustrates a block diagram of a computer operable to execute the disclosed in situ search for active note taking architecture.

Referring now to FIG. 10, there is illustrated a block diagram of a computer operable to execute the disclosed in situ search for active note taking system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
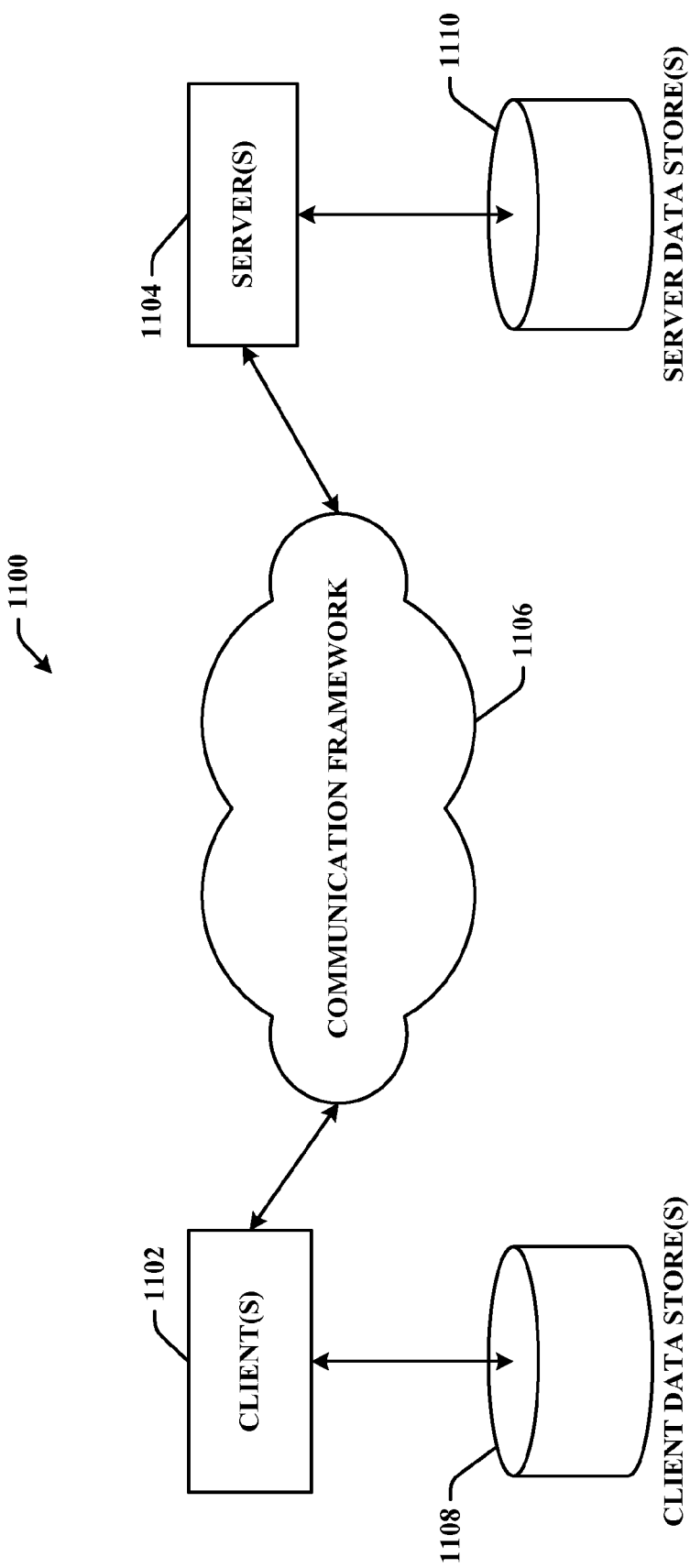
FIG. 11 illustrates a schematic block diagram of an exemplary computing environment for processing the in situ search for active note taking architecture in accordance with another aspect.

Referring now to FIG. 11, there is illustrated a schematic block diagram of an exemplary computing environment 1100 for processing the in situ search for active note taking architecture in accordance with another aspect. The system 1000 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1004 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1008 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system for facilitating in situ search for active note taking, comprising the following components stored in a computer readable storage medium and executable by a processor:
    a gesture discernment component that receives a gesture from an input device identifying at least one inked handwritten script and recognizes the gesture as belonging to a set of previously persisted gestures;
    an embeddable object component that associates an embeddable graphical object with the at least one inked handwritten script, the embeddable graphical object being associated with recognized query text and/or a number of results returned in response to the recognized query text and additional embeddable graphical objects, the additional embeddable graphical objects being associated with disparate functions;
    a tracking menu comprising:
        a scroll ring that receives pseudo-circular motion from the input device and translates the motion into vertical or horizontal scrolling in a focus application of a system manager window;
        a capture tool that allows a user to circumscribe an area of a display;
        a close box that dismisses the tracking menu; and
        a move handle for dragging the tracking menu to a new position, the tracking menu providing cross application functionality between disparate applications;
    a handwriting digital conversion component that digitizes and analyzes the at least one inked handwritten script; and
    a search component that instantiates a search to return results using the digitized and analyzed at least one inked handwritten script, the results coupled with the embeddable graphical object.

2. The computer-implemented system of claim 1, wherein the gesture includes selection of a gesture mode with the system and circumscription of an area on a display.

3. The computer-implemented system of claim 2, wherein the area circumscribed includes zero or more alphanumeric characters.

4. The computer-implemented system of claim 1, wherein the gesture includes depression of a button on a stylus and contemporaneous sweeping of the stylus over previously scribed terms.

5. The computer-implemented system of claim 1, wherein the at least one inked handwritten script includes at least one alphanumeric character.

6. The computer-implemented system of claim 1, wherein the embeddable graphical object is contiguously inserted and coupled with the at least one term identified by the gesture.

7. The computer-implemented system of claim 1, wherein the results coupled with the embeddable graphical object is displayed to a deferred time indicated by a user.

8. The computer-implemented system of claim 1, wherein the embeddable graphical object is manipulable and subject to one or more of excision, insertion, selection, deletion, movement or storage to permanent media and association with persisted data.

9. The computer-implemented system of claim 1, further comprising a classifier to that transforms scribed content into one or more of a search vector, a set of words, a term, or a filter suitable for information retrieval.

10. The computer-implemented system of claim 1, further comprising a digit situated over the embeddable graphical object displayed on a tablet that causes the embeddable graphical object to disclose information affiliated with the embeddable graphical object.

11. The computer-implemented system of claim 1, wherein the search returns results from a storage device associated with the system.

12. The computer-implemented system of claim 1, wherein the search returns results from the internet.

13. A machine implemented method for effectuating in situ search for active note taking, comprising:
    receiving and recognizing a gesture from an input device identifying at least one inked text;
    generating an embeddable graphical object and associating the embeddable graphical object with the at least one handwritten script, the embeddable graphical object being associated with recognized query text and/or a number of results returned in response to the recognized query text and additional embeddable graphical objects, the additional embeddable graphical objects being associated with disparate functions;
    employing a tracking menu comprising:
        a scroll ring that receives pseudo-circular motion from the input device and translates the motion into vertical or horizontal scrolling in a focus application of a system manager window;
        a capture tool that allows a user to circumscribe an area of a display;
        a close box that dismisses the tracking menu; and
        a move handle for dragging the tracking menu to a new position, the tracking menu providing cross application functionality between disparate applications;
    digitizing and analyzing the at least one handwritten script;
    initiating a search with the digitized and analyzed at least one handwritten script to return results;
    coupling the results with the embeddable graphical object; and
    inserting the embeddable graphical object in close proximity to the at least one handwritten script.

14. The method of claim 13, further comprising displaying a directional stroke labeled with a short textual description that indicates a permissible gesture.

15. The method of claim 13, further comprising animating highlighter hints into or out of an interface control utilized for dismissal and retrieval of the highlighter hints by a user.

16. A computer-implemented system for facilitating in situ search for active note taking, comprising the following components stored in a computer readable storage medium and executable by a processor:

means for receiving and recognizing a gesture identifying at least one handwritten script from an input means;

means for creating an embeddable graphical object and associating the embeddable graphical object with the at least one handwritten script, the embeddable graphical object being associated with recognized query text and/or a number of results returned in response to the recognized query text and additional embeddable graphical objects, the additional embeddable graphical objects being associated with disparate functions;

means for employing a tracking menu comprising:
   a scroll ring that receives pseudo-circular motion from the input device and translates the motion into vertical or horizontal scrolling in a focus application of a system manager window;
   a capture tool that allows a user to circumscribe an area of a display;
   a close box that dismisses the tracking menu; and
   a move handle for dragging the tracking menu to a new position, the tracking menu providing cross application functionality between disparate applications;

means for digitizing and analyzing the at least one handwritten script;

means for searching to return results using the digitized and analyzed at least one handwritten script; and means for inserting the embeddable graphical object in close proximity to the at least one handwritten script on the input means.

* * * * *